US011583153B2

(12) United States Patent
Britain et al.

(10) Patent No.: US 11,583,153 B2
(45) Date of Patent: *Feb. 21, 2023

(54) METHOD OF CONTROLLING A MOBILE ROBOT

(71) Applicant: Dyson Technology Limited, Wiltshire (GB)

(72) Inventors: Maximilian John Britain, Swindon (GB); William Matthew Wakeling, Bristol (GB); Christopher John Ord, Bath (GB)

(73) Assignee: Dyson Technology Limited, Malmesbury (GB)

( * ) Notice: Subject to any disclaimer, the term of this patent is extended or adjusted under 35 U.S.C. 154(b) by 171 days.

This patent is subject to a terminal disclaimer.

(21) Appl. No.: 16/016,889

(22) Filed: Jun. 25, 2018

(65) Prior Publication Data

US 2018/0303302 A1    Oct. 25, 2018

Related U.S. Application Data

(62) Division of application No. 15/165,826, filed on May 26, 2016, now Pat. No. 10,028,632.

(30) Foreign Application Priority Data

May 28, 2015    (GB) ..................... 1509192

(51) Int. Cl.
*A47L 9/28*    (2006.01)
*A47L 9/00*    (2006.01)
(Continued)

(52) U.S. Cl.
CPC .............. *A47L 9/2805* (2013.01); *A47L 9/00* (2013.01); *A47L 9/2842* (2013.01);
(Continued)

(58) Field of Classification Search
None
See application file for complete search history.

(56) References Cited

U.S. PATENT DOCUMENTS 5,499,306 A    3/1996  Sasaki
5,559,696 A    9/1996  Borenstein
(Continued)

FOREIGN PATENT DOCUMENTS

CN    1361673    7/2002
DE    102010000573    9/2011
(Continued)

OTHER PUBLICATIONS

Britain et al., U.S. Office Action dated Aug. 23, 2017, directed to U.S. Appl. No. 15/165,826; 15 pages.
(Continued)

*Primary Examiner* — Yuen Wong
*Assistant Examiner* — Hongye Liang
(74) *Attorney, Agent, or Firm* — Faegre Drinker Biddle & Reath LLP

(57) ABSTRACT

A mobile robot that includes a control system, a task execution system and a drive system, the control system configured to monitor the task execution system and drive system, wherein the control system comprises an error detection unit, the error detection unit configured to detect a first error in the task execution system and a second error in the drive system, and further configured to determine that a third error has occurred if it detects the first error and the second error at the same time.

6 Claims, 6 Drawing Sheets

(51) Int. Cl.
*B25J 11/00* (2006.01)
*G07C 5/08* (2006.01)

(52) U.S. Cl.
CPC ......... *B25J 11/0085* (2013.01); *G07C 5/0808* (2013.01); *A47L 2201/06* (2013.01); *Y10S 901/01* (2013.01)

(56) References Cited

U.S. PATENT DOCUMENTS

| | | | |
|---|---|---|---|
| 5,911,767 | A | 6/1999 | Garibotto et al. |
| 5,957,984 | A | 9/1999 | Rencken |
| 6,018,696 | A | 1/2000 | Matsuoka |
| 6,025,687 | A | 2/2000 | Himelda |
| 6,041,274 | A | 3/2000 | Onishi |
| 6,472,839 | B1 | 10/2002 | Ishii |
| 6,766,558 | B1 | 7/2004 | Matsumoto et al. |
| 7,100,725 | B2 | 9/2006 | Thorne |
| 7,112,938 | B2 | 9/2006 | Takenaka |
| 7,145,306 | B2 * | 12/2006 | Aihara ................... B25J 9/1602 318/568.12 |
| 7,162,056 | B2 | 1/2007 | Burl |
| 7,162,338 | B2 | 1/2007 | Goncalves |
| 7,236,852 | B2 | 6/2007 | Moridaira |
| 8,135,498 | B2 | 3/2012 | Hyung |
| 8,271,133 | B2 | 9/2012 | Park |
| 8,515,578 | B2 | 8/2013 | Chiappetta |
| 8,838,274 | B2 | 9/2014 | Jones |
| 8,873,832 | B2 | 10/2014 | Shin |
| 8,930,023 | B2 | 1/2015 | Gutmann |
| 8,938,319 | B2 | 1/2015 | Park |
| 9,233,472 | B2 | 1/2016 | Angle |
| 9,317,038 | B2 | 4/2016 | Ozick |
| 9,392,920 | B2 | 7/2016 | Halloran |
| 9,442,177 | B2 | 9/2016 | Lin |
| 9,457,471 | B2 | 10/2016 | Schnittman |
| 9,701,016 | B1 | 7/2017 | Urata |
| 9,717,387 | B1 | 8/2017 | Szatmary |
| 2005/0166353 | A1 | 8/2005 | Uehigashi |
| 2006/0171491 | A1 * | 8/2006 | Tapaninen ........... H04B 1/7085 375/343 |
| 2006/0278087 | A1 | 12/2006 | Sepke et al. |
| 2009/0171504 | A1 | 7/2009 | Hyung et al. |
| 2011/0166763 | A1 | 7/2011 | Choi |
| 2011/0239397 | A1 * | 10/2011 | Dekkers .................. A47L 9/009 15/319 |
| 2012/0219207 | A1 * | 8/2012 | Shin ..................... G05D 1/0272 382/153 |
| 2014/0130292 | A1 | 5/2014 | Pedlar |
| 2014/0207282 | A1 | 7/2014 | Angle |
| 2016/0167234 | A1 | 6/2016 | Angle |
| 2016/0271795 | A1 | 9/2016 | Vicenti |
| 2016/0345791 | A1 | 12/2016 | Britain |
| 2017/0072963 | A1 | 3/2017 | Matsuno |

FOREIGN PATENT DOCUMENTS

| | | |
|---|---|---|
| EP | 1640119 | 3/2006 |
| GB | 2513193 | 10/2014 |
| JP | 2002-360482 | 12/2002 |
| JP | 2004-357768 | 12/2004 |

OTHER PUBLICATIONS

International Search Report and Written Opinion dated Sep. 28, 2016, directed to International Application No. PCT/GB2016/051365; 9 pages.

Search Report dated Sep. 30, 2015, directed to GB Application No. 1509192.9; 1 page.

* cited by examiner

METHOD OF CONTROLLING A MOBILE ROBOT

REFERENCE TO RELATED APPLICATIONS

This application is a divisional of U.S. application Ser. No. 15/165,826, filed May 26, 2016, which claims the priority of United Kingdom Application No. 1509192.9, filed on May 28, 2015, the entire contents of each of which are incorporated herein by reference.

FIELD OF THE INVENTION

The present invention relates to a method of controlling a mobile robot, and to error detection on a mobile robot.

BACKGROUND OF THE INVENTION

Mobile robots are becoming increasingly commonplace and are used in such diverse fields as space exploration, lawn mowing and floor cleaning. Recently there has been a rapid advancement in the field of robotic vacuum cleaners, the primary objective of which is to navigate and vacuum a user's home autonomously and unobtrusively, whilst requiring as little assistance from a human user as possible and preferably none.

In performing this task, a robotic vacuum cleaner must be able to autonomously navigate and negotiate obstacles within their environment, and also be able to provide a good level of cleaning performance on a number of different floor types. For example it is expected that a single robot vacuum cleaner would be required to clean most rooms within a typical home environment, and so should be able to provide a good cleaning performance on floor surfaces such as tiles, hard wood, thin and thick carpet, linoleum etc.

It is expected that from time to time during operation, robots will encounter problems. For example a robot vacuum cleaner may suck up a large object that creates a blockage in the airflow through the machine, a cable may become tangled around a brushbar or similar. Often, such problems will require human intervention in order to clear the problem and set the robot back on course. However, any required human intervention could be perceived as a nuisance by the user, and it is preferable if the robot is able to resolve errors itself whenever possible, without requiring any human intervention.

SUMMARY OF THE INVENTION

According to some embodiments, this invention provides a method of controlling a mobile robot, the method comprising monitoring a first system of the mobile robot to detect a first error associated with the first system, and monitoring a second system of the mobile robot to detect a second error associated with the second system, wherein when the first error and the second error are detected at the same time, determining that a third error has occurred.

The method, whilst specified above as for controlling a mobile robot, may be used in the control of other devices, for example vacuum cleaners, hair care products and other such consumer electronics.

As a result, the robot is able to more accurately determine an error that the robot is experiencing, and can therefore better identify an error state which it is able to resolve itself without the need for a user to interact with the robot. This improves the autonomous nature of the mobile robot, and enhances a user's experience of the mobile robot.

The method may further comprise causing the robot to perform an error-handling operation in response to a determination that a third error has occurred. By resolving the error itself, the robot will not require any human intervention. As a result, the mobile robot is able to more effectively perform its assign task autonomously.

The error-handling operation performed in response to the third error may be different to an alternate error-handling operation performed in response to one of the first or the second error. As a result, the most suitable error-handling operation can be assigned to resolve the specific problem identified by the mobile robot.

The first system may be a floor cleaning system and may comprise a motor for generating an airflow through the mobile robot. As a result, a robotic vacuum cleaner can be provided with improved autonomy. In this instance, the first error may be an airway blockage, and detection of the first error may comprise detecting a reduction in load experienced by the motor. The reduction in load may be detected by sensing an unexpected increase in motor speed.

The second system may be a drive system and comprises one or more navigation sensors to monitor the robot's position within an environment, and a drive actuator to move the robot within the environment. In this instance, the second error may be slip, and the step of monitoring the second system may comprise monitoring changes in position of the robot as the robot is driven. Then, detection of the second error may comprise detecting that a change in the robot's position detected by the one or more navigation sensors does not correspond to the amount driven by the drive actuator.

The third error may be a limpet-state of the robot. The determination of a limpet-state error will allow the mobile robot to be able to better resolve the problem where the level of suction generated by the mobile robot negatively impacts the manoeuvrability of the mobile robot.

The first system may comprise a motor for generating an airflow through the mobile robot, and wherein the error-handling operation in response to a determination that a third error has occurred comprises running the motor in a reduced power mode to reduce suction and continuing to drive the robot. As a result, during the error-handling operation the motor will not create enough suction to impede the mobile robot's mobility, but will continue to produce some airflow through the mobile robot while the mobile robot is able to navigate away from the area of floor surface on which the third error occurred.

The motor may be run in the reduced power mode until the mobile robot has travelled outside a calculated area of pre-determined size, the centre of said calculated area being the position at which the third error was detected. This allows the mobile robot to travel away from the area in which the error occurred such that there is less chance that a repeat of the third error will occur when the motor returns to a normal power level.

The first error and the second error may be detected at the same time if an instance of one or other of the first or second error is detected whilst an instance the other of the first or second error is on-going. As a result, the mobile robot is better able to distinguish between an instance of either the first or the second error and an instance of the third error.

This invention also provides a mobile robot comprising a control system, a task execution system and a drive system, the control system configured to monitor the task execution system and drive system, wherein the control system comprises an error detection unit, the error detection unit configured to detect a first error in the task execution system and a second error in the drive system, and further configured to determine that a third error has occurred if it detects the first error and the second error at the same time.

As a result, an improved mobile robot is provided that is better at distinguishing between different errors that it encounters.

The control system may further comprise an error handling unit configured to carry out one of a first or second error-handling operation in response to the detection of either the first or second error respectively, and further configured to alternatively carry out a third error handling operation in response to the determination that a third error has occurred. As a result, the mobile robot can assign a more suitable error-handling task for addressing the error that has been detected. This also may allow it to autonomously handle and clear more errors without requiring a user to intervene.

The task execution system may be a floor cleaning system comprising a motor for generating an airflow through the mobile robot. This allows a mobile robot such as a robot vacuum cleaner to operate autonomously more effectively. The first error may be an airway blockage, the second error may be slip, and the third error may be a limpet-state of the mobile robot.

The invention also provides an error detection unit for a mobile robot, the error detection unit comprising: a monitoring unit for monitoring one or more parameters of a first and a second system of the mobile robot, and identifying one or more parameters of the first and second systems that are indicative of errors, and an error determination unit capable of determining that: a first error has occurred if the monitoring unit identifies parameters of the first system that are indicative of an error; a second error has occurred if the monitoring unit identifies parameters of the second system that are indicative of an error; and a third error has occurred if the monitoring unit identifies parameters of both the first and second system that are indicative of errors at the same time.

The control system and error detection units previously described may further be adopted in devices other than a mobile robot. For example, they may find utility in vacuum cleaners, hair care appliances, and other such consumer electronics.

The invention further provides a non-transitory computer-readable storage medium comprising computer-executable instructions which, when executed by a processor, cause a computing device to perform a method of controlling a mobile robot, the method comprising monitoring a first system of the mobile robot to detect a first error associated with the first system, and monitoring a second system of the mobile robot to detect a second error associated with the second system, wherein when the first error and the second error are detected at the same time, determining that a third error has occurred.

BRIEF DESCRIPTION OF THE DRAWINGS

In order that the present invention may be more readily understood, embodiments of the invention will now be described, by way of example, with reference to the following accompanying drawings, in which.

DETAILED DESCRIPTION OF THE INVENTION

Certain examples described herein enable a mobile robot to better determine an error that is affecting its intended operation. These examples enable the robot to assign a more appropriate error-handling operation in order to address the error. In certain examples described herein, an error-handling operation may be carried out that allows the robot to autonomously address the error itself without requiring any assistance from a human user.

Figure 1:
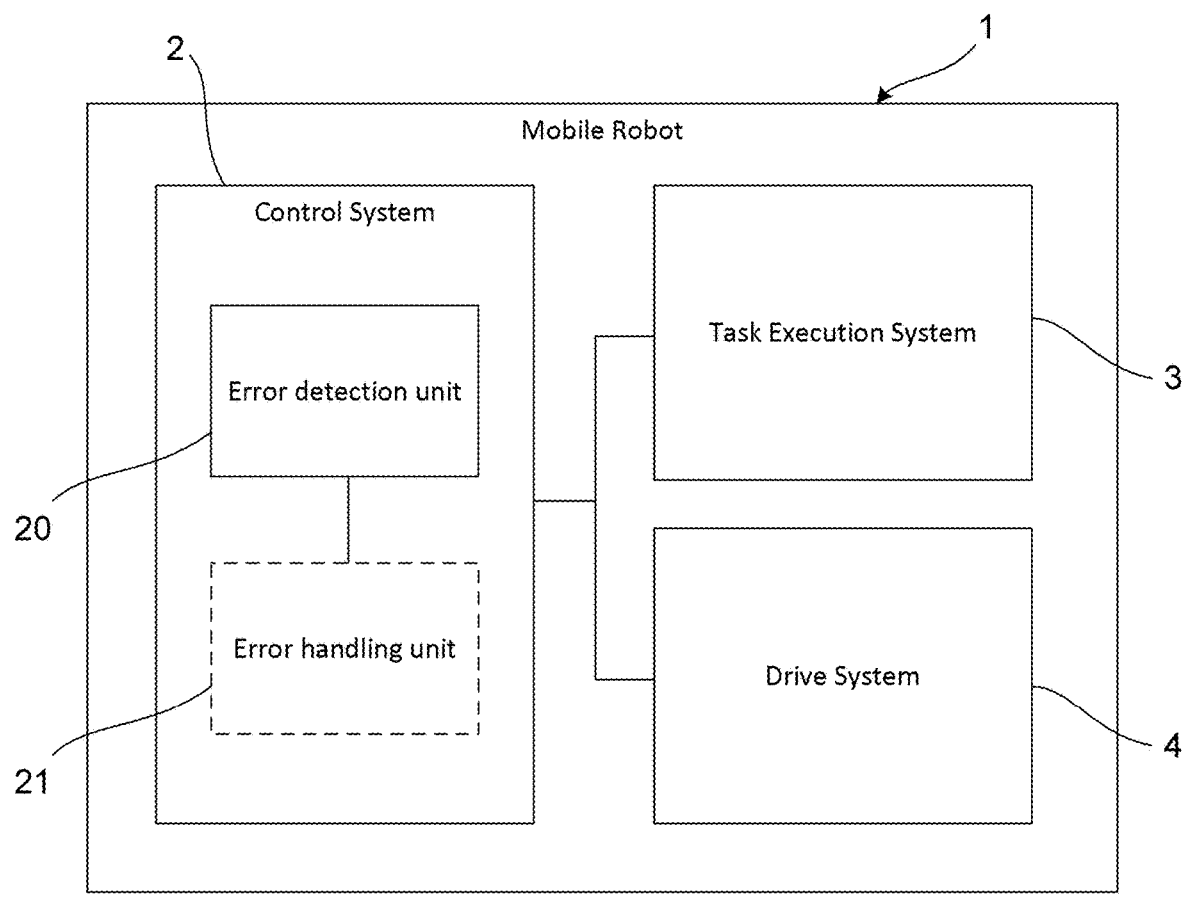
FIG. 1 is a schematic representation of a mobile robot.
Figure 2:
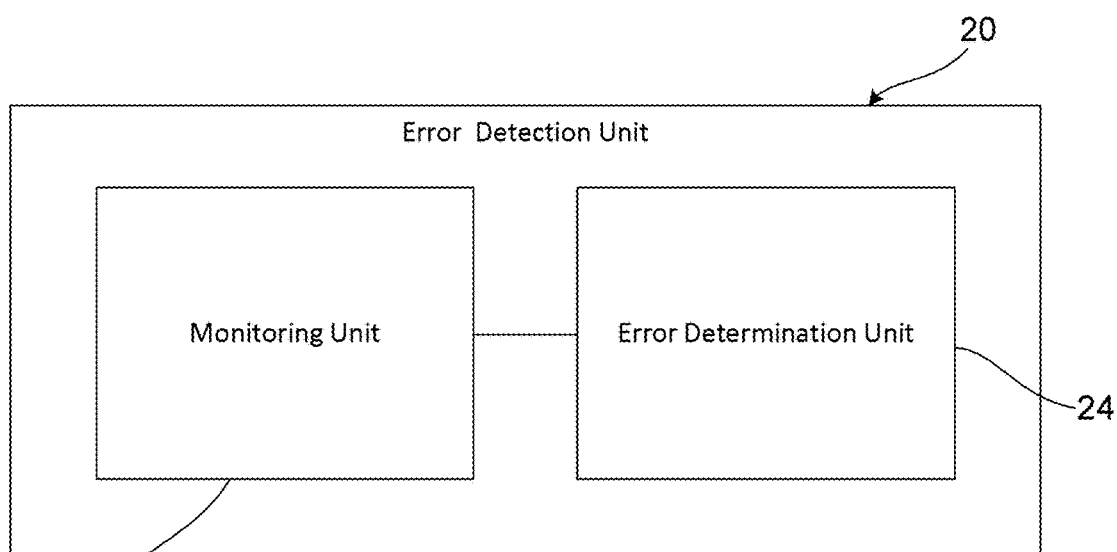
FIG. 2 is a schematic representation of an error detection unit.

The mobile robot 1 schematically illustrated in FIG. 1 has a control system 2, a task execution system 3 and a drive system 4. The control system 2 comprises an error detection unit 20 and in some embodiments may further comprise an error handling unit 21. One embodiment of the error detection unit 20 is shown in FIG. 2. The error detection unit 20 of FIG. 2 comprises a monitoring unit 22 which monitors the task execution system 3 and drive system 3 of the mobile robot 1. The monitoring unit can monitor parameters of systems in the mobile robot 1 and identify parameters that are indicative of errors within those systems. The identified parameters can then be used by the error determination unit 20 to determine which error has occurred.

Figure 3:
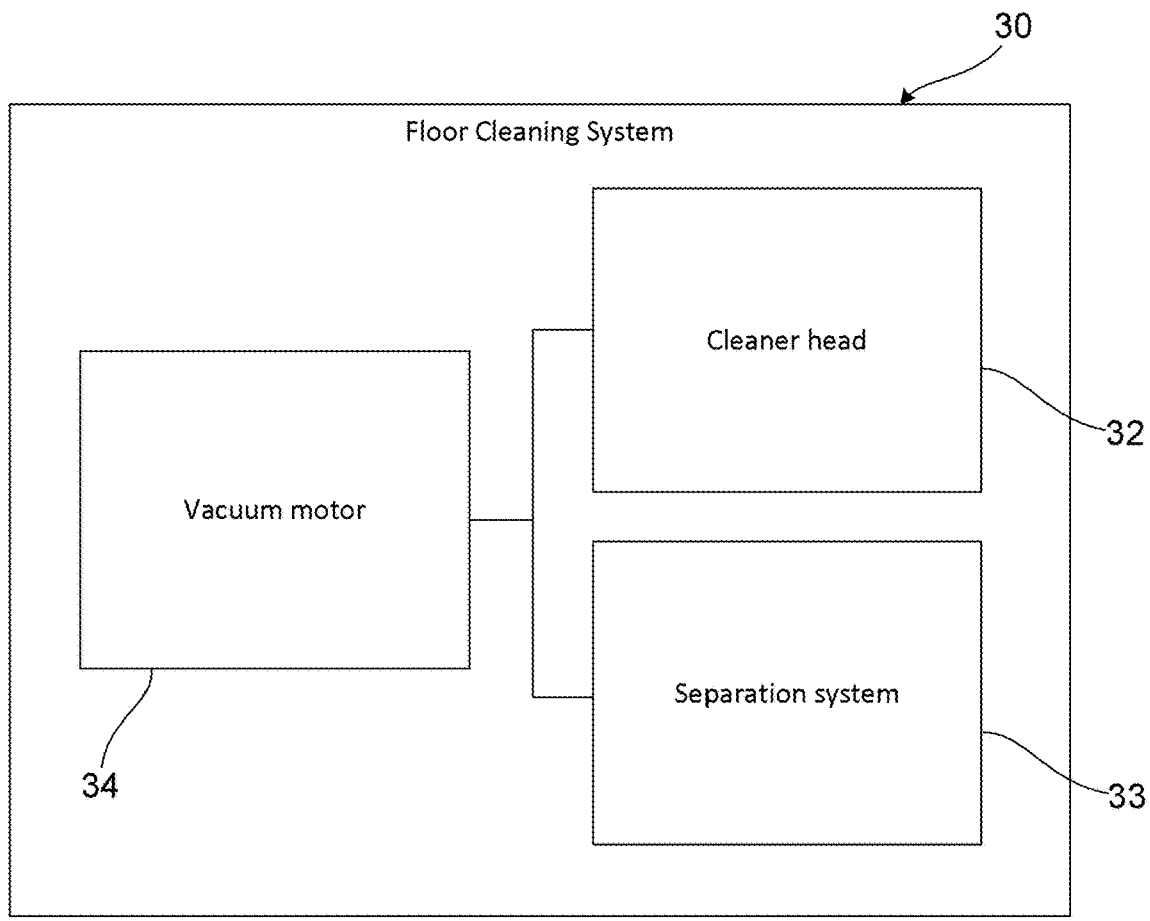
FIG. 3 is a schematic representation of a floor cleaning system.

The task execution system 3 is the system provided to the mobile robot for carrying out tasks assigned to the mobile robot. For example, the mobile robot 1 may be a robotic lawn mower in which instance the task execution system 3 could be a grass cutting and/or collection system. In a further example, the mobile robot 1 may be a robotic floor cleaner, and the task execution system 3 would be floor cleaning system. A schematic representation of such a floor cleaning system 30 is shown in FIG. 3. The floor cleaning system 30 comprises a cleaner head 32, a separation system 33 and a vacuum motor 34. These features of the floor cleaning system are ordinary features of a floor cleaning system, and no further explanation of these systems will be provided here. Other examples of task execution systems will be apparent.

Figure 4:
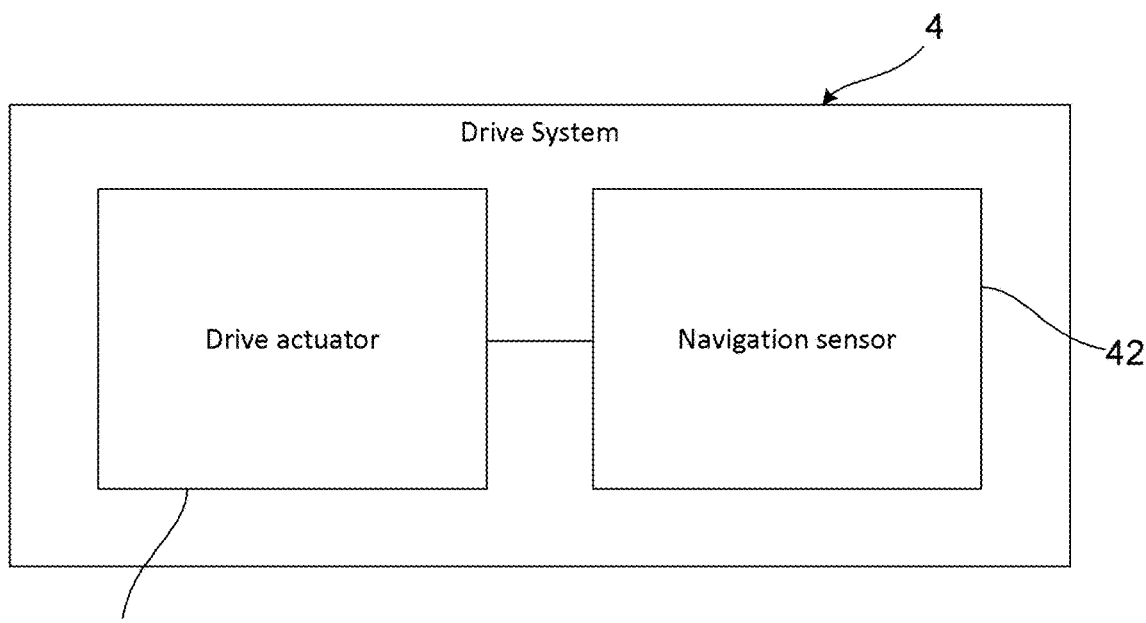
FIG. 4 is a schematic representation of a drive system.

The drive system 4 enables the mobile robot to manoeuvre and navigate around an environment in which it must carry out the task it has been set. A schematic representation of a drive system is provided in FIG. 4. The drive system 4 is provided with a drive actuator 40 and a navigation sensor 42. The drive actuator 40 may be, for example, driven wheels or tank tracks, and is able to provide odometry measurements to the control system 2 of the mobile robot 1. These odometry measurements can be used by the control system 2 to estimate the distance and path travelled by the mobile robot 1. The navigation sensor 42 is a sensor that is able to provide information to the control system 2 of the environment around the mobile robot 1. For example the navigation sensor 42 may be a vision camera, a proximity sensor, a laser range finder. The mobile robot 1 will typically use a number of different types of navigation sensor in order to be able to autonomously navigate an environment more successfully. The navigation sensor 42 provides information to the control system 2 about the environment around the robot 1 that enables the control system 2 to build up a map of the environment that can be used by the mobile robot 1 to navigate. In some examples, the navigation sensor 42 may form part of a navigation engine of the mobile robot. Such a navigation engine may share some aspects and functionality of the control system 2. In further alternative examples, some of the functionality of the control system 2 may be shared across other systems of the mobile robot 1. For example, each system in the mobile robot 1 may be capable of monitoring its own parameters and identifying parameters that are indicative of errors.

Figure 5:
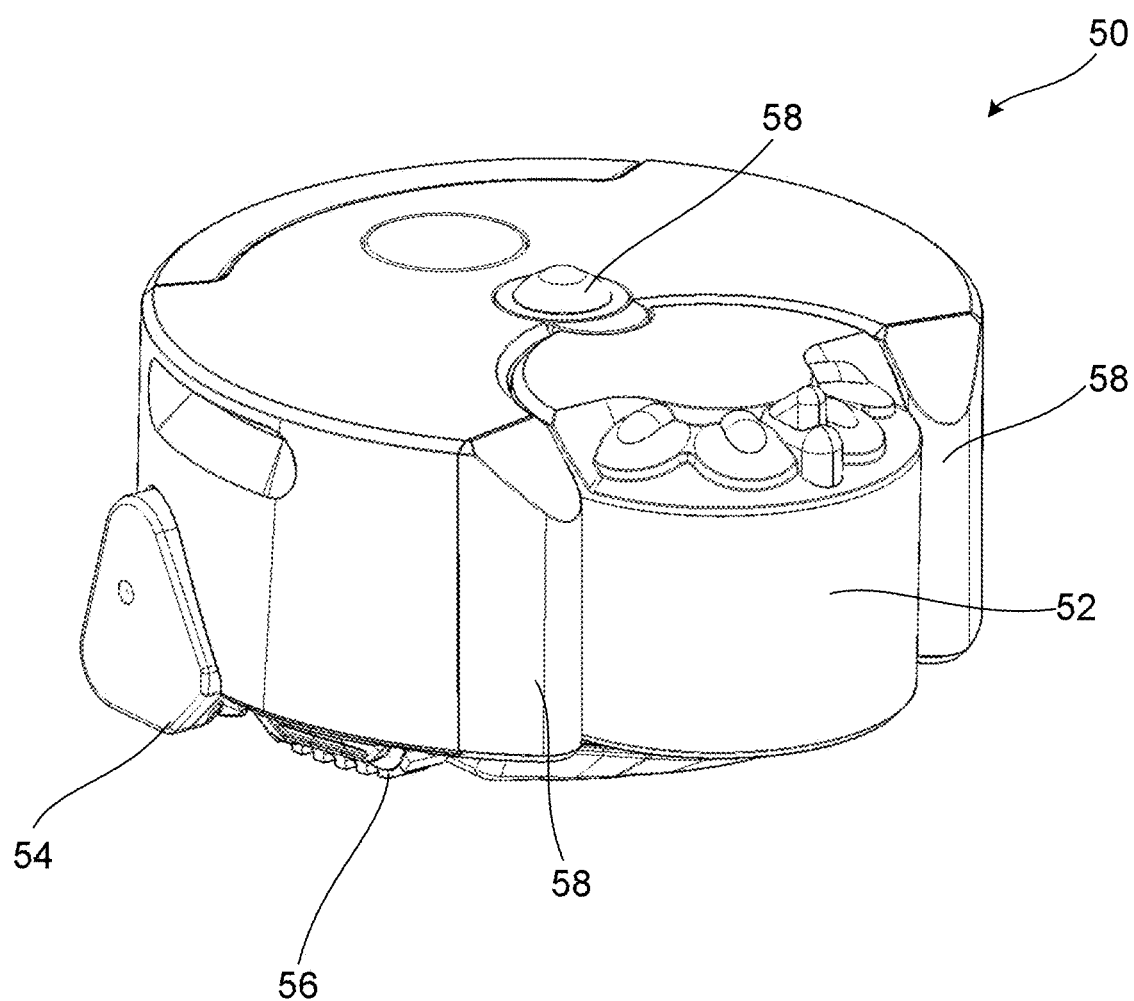
FIG. 5 is a robot vacuum cleaner.

FIG. 5 shows an example of a mobile robot. The mobile robot is a robotic vacuum cleaner 50 and has a floor cleaning system comprising a cyclonic separating system 52 and a cleaner head 54. A vacuum motor (not shown) provided inside the main body of the robot vacuum cleaner 50 draws dirty air in from the cleaner head 54, through the cyclonic separator 52 where the dirt particles are removed from the airflow, and then expels the clean air through a vent (not shown) in the back of the robot. The robot vacuum cleaner 50 has drive actuators in the form of tank tracks 56 which can be driven to move the robotic vacuum cleaner 50 around an environment in which it is located. The robot vacuum cleaner 50 has a navigation sensor comprising a 360-degree panoramic annular lens camera 58 which is able to capture images of the area around the robot vacuum cleaner 50. The robot's control system uses Simultaneous Localisation and Mapping (SLAM) techniques on the images captured by the camera 58 in order to build a map of the environment and to identify the position of the robot within that map. The SLAM techniques carried out by the control system also use odometry measurements provided from the driven tank tracks, and also information provided from other sensors, such as proximity sensors, located in the sensor housings 59 positioned either side of the cyclonic separator 52.

Robot vacuum cleaners typically have small vacuum motors which do not create a large amount of suction. However, with vacuum motors improving and decreasing in size over time, it is possible to provide robotic vacuum cleaners with more powerful vacuum motors. This provides the robotic vacuum cleaner with better suction power, which gives rise to improved cleaning performance. Of course, if the suction power of the robotic vacuum cleaner is too great, then it may be possible for the suction to negatively affect the manoeuvrability of the robot. Indeed, it is possible that if enough suction is generated by the vacuum motor, the robot can suck itself to the floor surface with such great force that the drive system is not able to move the robot. This is sometimes referred to as a "limpet-state". When the robot vacuum cleaner is experiencing a limpet-state error, the wheels or tracks of the robot will spin on the floor surface but the robot will not move due to the force with which the robot is being drawn to the floor surface by the suction power.

As already explained, the error detection unit 20 of the control system 2 can monitor parameters provided to it by other systems within the mobile robot 1. For example, the floor cleaning system 30 may provide an indication of the load experienced by the vacuum motor 34. If there is a blockage within the airway through the floor cleaning system 30, then the pressure through the system will reduce, and a drop in load experienced by the vacuum motor will be evident in the parameters, for example there may be an unexpected increase in motor speed. The error handling unit 21 can then carry out an appropriate error handling operation in order to resolve the problem. For an airway blockage, the error handling operation would typically be to stop the cleaning operation, stop all movement of the robot 1, and present an error to a user. The user will then be directed to look for and clear the blockage before allowing the robot 1 to resume the cleaning operation.

Another example of an error that can be handled by the error detection unit 20 is that of "slip". A slip error occurs when the mobile robot's drive actuator 40 attempts to move the robot, but the robot does not move. This may be, for example, because the robot has navigated into an area where the drive actuator 40 is not effective against the floor surface, or may also be because the mobile robot has navigated itself onto an obstacle which raises the body up so that the drive actuator 40 is no longer able to make contact with the floor surface, sometimes referred to as being "beached". This slip error can be detected by the error detection unit 20 because the odometry measurements received by the control system 2 do not correlate with the information being provided from the navigation sensor 42. For example, the drive actuator 40 odometry measurements indicate that the mobile robot should have moved in a forward direction a distance of 0.5 metres, but the navigation sensor 42 shows that the robot has not moved at all, or much less than expected. In response to a slip error being detected, the error handling unit 21 can again cause the robot to carry out an appropriate error handling operation in an attempt to resolve the error. For a slip error, the error handling operation could be to stop the robot 1 and present an error to a user. The user can then investigate the problem, and address the error by picking up the robot and positioning it on a different part of the floor surface.

The two examples of errors described above require user input to help resolve the error. As has already been explained above, any need for a user to interact with an autonomous robot is undesirable. Not all errors require a user to be involved in the error handling operation, and the better a mobile robot can more accurately identify an error correctly, the better an appropriate error handling operation can be assigned with a view of addressing that specific error.

Regarding the limpet-state error described above, there is no single parameter that can indicate that the robot has entered a limpet-state. However, a limpet state will give rise to indications of both the blockage and slip errors. Therefore, when the robot enters a limpet-state, instances of both blockage and slip errors will be detected. Both the error handling operations for these two errors require a user to interact with the robot as previously explained. However, it would be possible for a mobile robot to handle a limpet-state error itself without needing a user to intervene. Therefore, an improved method of identifying errors in a mobile robot will now be described that can be used to better distinguish between different error types. In particular, the improved method is able to distinguish between one of a blockage error or a slip error, and a limpet-state error.

Figure 6:
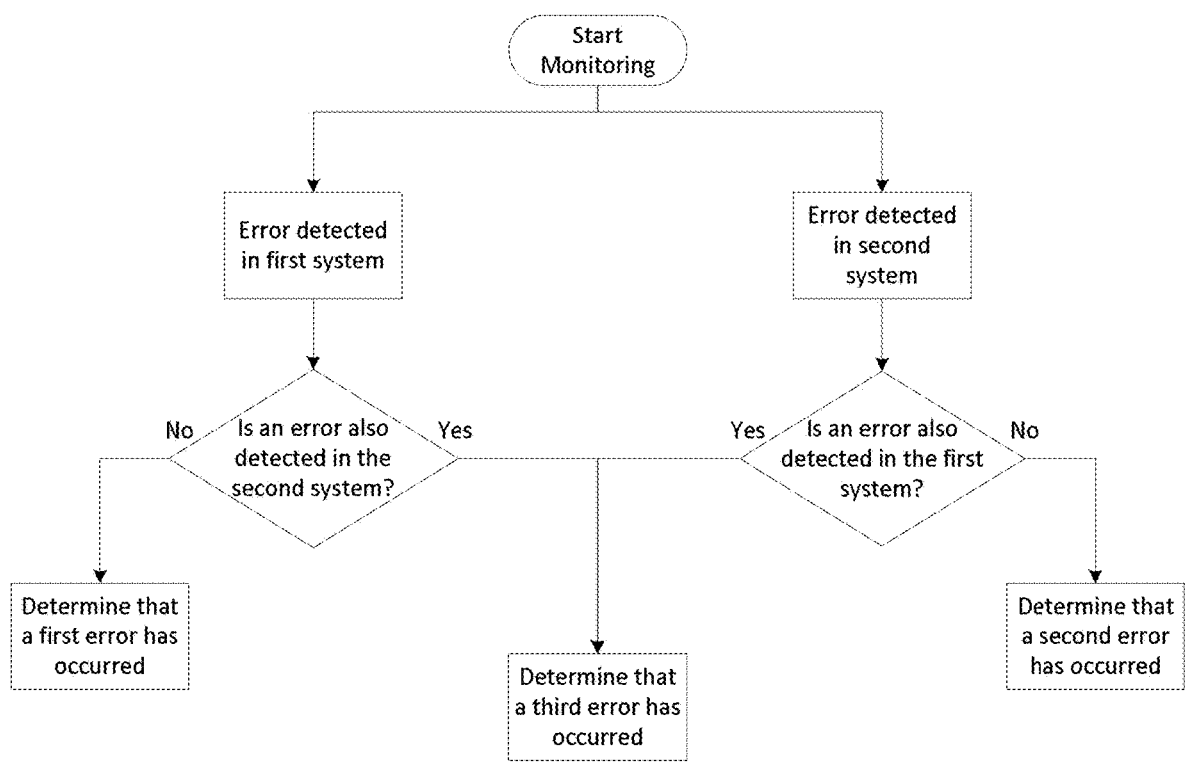
FIG. 6 is a flow diagram outlining a method of controlling a mobile robot.

FIG. 6 is a flow diagram which outlines a method of identifying errors in a mobile robot. In the method, it is recognized that monitoring parameters in a system may incorrectly identify an error in that system when in fact a different error is occurring that happens to give rise to the same parameters. In the method of FIG. 6, information about detected errors in other associated systems can be used to better pinpoint and determine the actual error that has occurred. The method starts by monitoring of parameters of the systems of the mobile robot. If an error is detected in a first system, the next step is to check if an error has also been detected in the second system. If there is no error in the second system, then it can be determined that a first error has occurred. Similarly, if an error is detected in the second system, the next step is to check if an error has also been detected in the first system. If there is no error also detected in the first system, then is can be determined that the second error has occurred. However, if in either instance it is detected that there is also an error in the other of the first or second system, then it can be determined that a third error has occurred which is different to either the first or second errors.

As has already been explored, a limpet-state error is an example of an error that manifests itself as a combination or other errors. The method described above will now be applied to the example of a limpet-state error in a robotic vacuum cleaner. In the robotic vacuum cleaner, the first system is the floor cleaning system and the second system is the drive system. The first error associated with the floor cleaning system could be an airway blockage as described above, and the second error associated with the drive system could be a slip error. When the suction of the robotic vacuum cleaner causes the robot to suck itself to the floor, the suction opening of the cleaner head will be drawn into close contact with the floor surface and a seal will be created between the cleaner head and the floor surface. As a consequence, it will be very difficult for air to be drawn into the suction opening, and a partial vacuum will be created inside the cleaner head. This in turn will reduce the load on the vacuum motor, and the running speed of the motor may increase. The control system which will be monitoring parameters of the vacuum motor will detect a blockage error in the floor cleaning system.

The second system in the robotic vacuum cleaner is the drive system. The error which is associated with the drive system is a slip error. When the suction of the robotic vacuum cleaner causes the robot to suck itself to the floor, the force with which the robot sucks itself to the floor overcomes the driving force provided by the drive actuator, which in this example are driven tank tracks. As such, the tank tracks will turn, but will skid over the floor surface and the robot vacuum cleaner will not move. The navigation sensors on the robot will identify that the robot is not moving, and the control system which is monitoring parameters from the drive system, will detect that the movement of the wheels does not correspond with the lack of movement identified by the navigation sensors. The control system will therefore detect a slip error in the drive system.

Following the method set out in FIG. 6, if the control system detects an instance of the error in the first system, i.e. an airway blockage in the floor cleaning system, before determining that the error has occurred, it first checks if there is an error in the second system, i.e. if there is a slip error detected in the drive system. If no slip error is detected, the control system can then determine that an airway blockage has occurred. However, if a slip error is detected in the drive system, the control system can determine that a limpet-state error has occurred. The same happens in reverse: if the slip error is first detected in the drive system, then the control system will then check the floor cleaning system for an airway blockage error. If no airway blockage error is detected in addition to the slip error, then the control system will determine that a slip error has occurred. However, if an airway blockage error is detected at the same time as the slip error, then the control system will determine that a limpet-state error has occurred.

On detection of an error in the first or second system (the first error), the control system of the robot vacuum cleaner may be configured to look immediately for an error in the other of the first or second system (the second error). If no second error is detected in the other system immediately following detection of the first error, then the control system may determine that the first error has occurred. This allows the robot to act quickly in response to an error, but increases the chance that an error may be identified incorrectly. Alternatively, the control system of the vacuum cleaner may be configured to continue running the robot vacuum cleaner for a short period of time, for example for up to 2 seconds, following detection of the first error in order to allow for an instance of the second error to arise. This alternative configuration requires the robot to be run while an error state is on-going, however it also increases the likelihood that both the first and second error can be detected at the same time, and therefore a third error state (i.e. the limpet-state) be determined. As such, as it is more likely that a limpet-state error can be determined, it is also more likely that the robot vacuum cleaner will be able to address the error state itself autonomously without requiring user input.

Once a limpet-state error has been determined, the control system of the robot can cause the robot to perform an error handling operation specifically targeted towards clearing the limpet-state error autonomously. One example of an error handling operation for autonomously clearing a limpet-state error is described in the flow diagram of FIG. 7.

Figure 7:
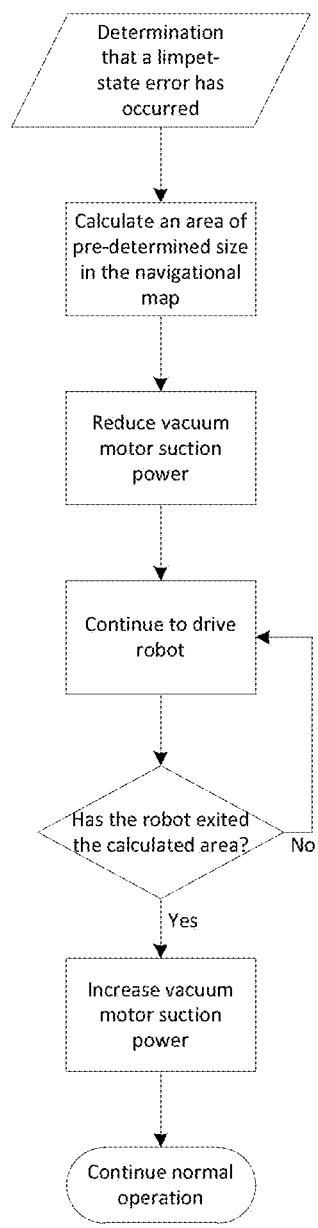
FIG. 7 is a flow diagram outlining a method of handling an error detected by a mobile robot.

The method of FIG. 7 starts with the determination of a third error as determined at the end of the flow diagram of FIG. 6. The third error in this example is a limpet-state error, however it will be appreciated that this error handling operation may be carried out in response to other errors as well. After determination of the error, an area of predetermined size is calculated in the navigational map. The suction power of the vacuum motor is then reduced. This can be done by reducing the power to the motor which reduces the rotational speed of the motor. The motor may, for example, be provided with a number of power maps that can be used to control the vacuum motor. Reducing the power can therefore be carried out by selecting a different power map to control the motor. Other methods of reducing the suction power of the vacuum motor will be apparent. With the level of suction reduced, the robot should then be free to move, and so the robot is then controlled to continue driving on the path that it was on. The cleaning operation that the robot was carrying out prior to the limpet-state error is therefore continued, except with a reduced amount of suction from the vacuum motor.

Once the suction power of the vacuum motor has been reduced, as the robot moves along its travel path the, the control system keeps checking to see if the robot has travelled outside the previously calculated area in the navigational map. If the robot remains inside the previously calculated area, the robot continues to follow its travel path, and no other changes are made. However, once the robot leaves the previously calculated area, the suction power of the vacuum motor is increased. The increase may return the suction power to the same level as prior to the limpet-state error being detected. Alternatively, the suction power may be increased in stages over a period of time until full suction power is reached. The robot then continues standard operation.

Figure 8:
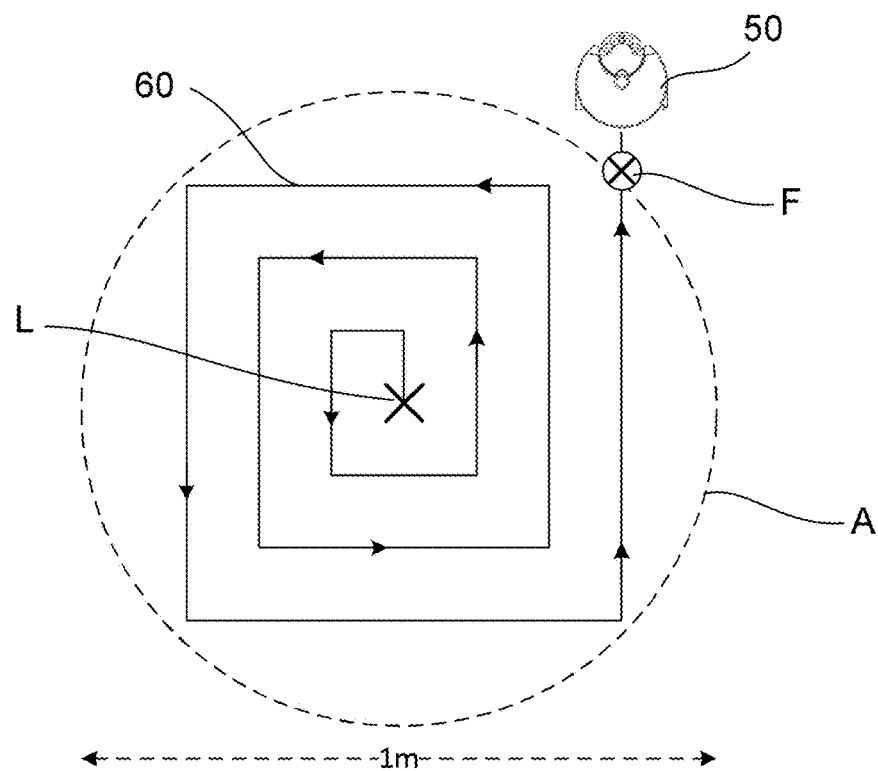
FIG. 8 is a representation of a first error handling operation.
Figure 9:
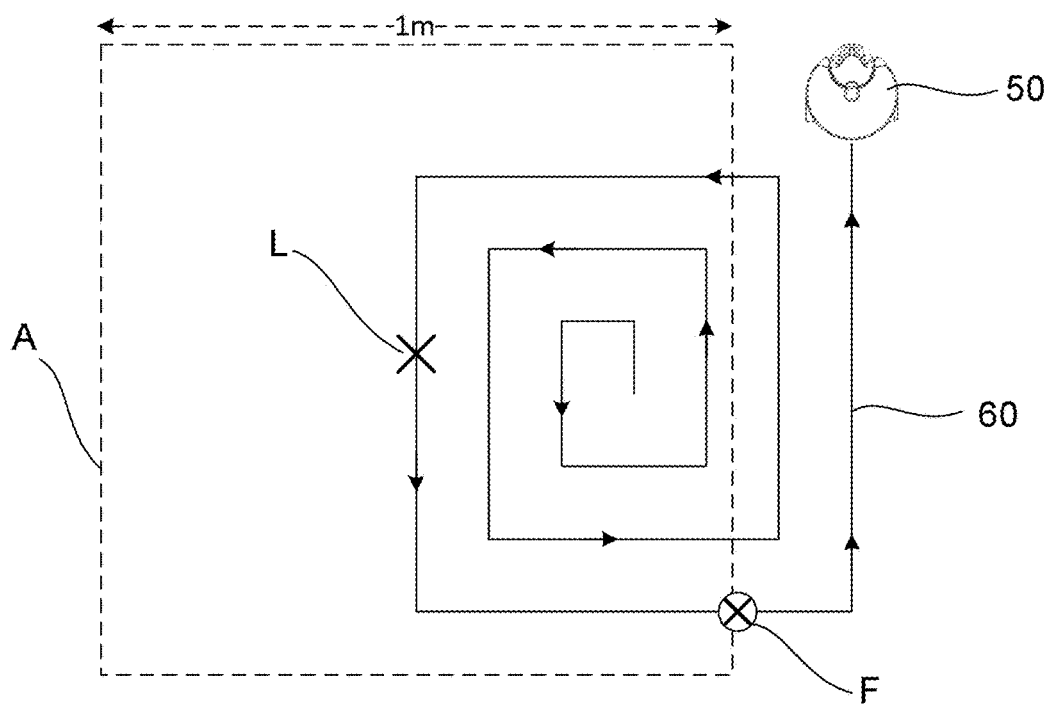
FIG. 9 is a representation of a second error handling operation.

Two examples of a robot vacuum cleaner 50 carrying out an error-handing operation and following the method of FIG. 7 are shown in FIGS. 8 and 9. The robot vacuum cleaner 50 follows a travel path 60 which is a square spiral pattern. The point at which the limpet-state error is determined is indicated by the symbol "X", and marked with the reference letter L. It is at this point that the control system starts the error handling operation. At this point, the control system of the robot calculates an area of pre-determined size A, and reduces the vacuum motor suction power to enter a low power mode. The robot vacuum cleaner then resumes travelling along its usual path. With the suction motor being run in a low power mode, the suction generated will not be enough to cause the robot to suck itself to the floor surface, and the robot is able to move around the environment as normal. In FIG. 8 the calculated area A is a circular area with a diameter of 1 metre, whereas in FIG. 9 the calculated area A is a 1 metre squared area. In both instances, the centre of the area A is the point L at which the limpet-state error was determined.

The shape of the calculated area may not be of particular importance. However, one shape may better suit other characteristics of the mobile robot, for example the shape of the robot and/or the pattern in which the robot is programmed to travel. Both FIGS. 8 and 9 show the robot vacuum cleaner travelling in a square spiral pattern; however other travel patterns will be apparent. The circular calculated area A shown in FIG. 8 may be more suited to a robot that follows a rounded spiral travel pattern (such as an Archimedean spiral), whereas the square calculated area may better suit a robot that follows a square spiral pattern, as show in the example in FIG. 9, or other regular linear travel patterns.

The aim of the robotic vacuum cleaner is to provide a high level of cleaning performance, and so it is also important that the vacuum cleaner resumes cleaning in its full power mode as quickly as possible, but with as little chance as possible of an immediate repeated instance of the limpet-state error. As such, the size of the calculated area is pre-determined and takes into account the need for the vacuum cleaner to resume full power at the earliest opportunity as well as the level of probability that the robot will have left the area of floor surface that gives rise to the limpet-state error. Through a process of statistical analysis as well as trial and error, this pre-determined size has been chosen as a 1 metre squared area for a robot vacuum cleaner tasked with cleaning a domestic environment. However, areas of different sizes may be more suited to mobile robots that are intended to carry out different tasks, and/or work within different environments.

As soon as the robot travels outside of the calculated area, the error handling operation stops, and the robot resumes the cleaning operation under normal conditions on full power. In FIGS. 8 and 9 the point at which the robot leaves the calculated area and resumes the cleaning procedure on full power is indicated by the symbol "⊗", and marked with reference letter F. In FIG. 8 the limpet-state error is detected at the start of the travel pattern, whereas in FIG. 9 the limpet-state error is detected part way around the square spiral pathway that the robot is taking. As such the length of the pathway in which the robot is running in low power mode (i.e. between the points labelled L and F) is much longer in FIG. 8 than in FIG. 9. This serves to highlight that merely running the robot vacuum cleaner in a low power mode for a pre-determined length of time might not be suitable for resolving a limpet-state error, as a length of time does not necessarily correspond to a distance travelled from a certain point, particularly when the robot is configured to follow a spiral travel path.

Once the robot has left a calculated area and resumed the cleaning operation on full power, the calculated area is forgotten. Therefore if the robot re-enters the previously calculated area, there is no change and the power remains on full power. This behaviour is intended to encourage the best cleaning performance for the largest proportion of an area to be cleaned as possible. The robot will only enter the low power mode again if a new instance of the limpet state error is determined. This new instance of the limpet-state error will be treated in exactly the same way is the first, with a new area of pre-determined size being calculated for the second instance of the limpet-state error. Alternatively, it may be beneficial in some circumstances for the robot to store the calculated area in memory after it had exited the area, and to resume the low power mode when it detects that it has re-entered the previously calculated area.

Whilst particular examples and embodiments have thus far been described, it will be understood that various modifications may be made without departing from the scope of the invention as defined by the claims. The methods of detecting an error as described above can be adopted by devices other than mobile robots, for example vacuum cleaners, hair care appliances and other consumer electronics. As the cost of microprocessors and other types of central processing units (CPUs) decrease, and as users expect the level of intelligence in their consumer products to increase, more and more devices will include intelligent control systems. By including control systems such as those described above in these devices, it may be possible to reduce the number of sensors required in the device, and as such the cost of the device can be minimised.

The invention claimed is:

1. A mobile robot comprising:
   a task execution system configured to perform a task assigned to the mobile robot;
   a drive system configured to drive the mobile robot across a surface; and
   a control system configured to monitor the task execution system and drive system,
   wherein the control system is further configured to:
      detect, by the control system, a first set of parameters indicative of a first error of the task execution system and a second set of parameters indicative of a second error of the drive system, wherein the first error is different than the second error and is an error in performance of the task;
      in response to contemporaneously detecting the first set of parameters indicative of the first error and the second set of parameters indicative of the second error, determine that a third error has occurred, and
      in response to determining that the third error has occurred, automatically adjust operation of the mobile robot to handle the determined third error.

2. The mobile robot of claim 1, wherein the control system is configured to carry out one of a first and second error-handling operation in response to detection of either the first or second error respectively, and wherein the adjustment of the operation performed in response to the determination that the third error has occurred is different than the first and second error-handling operations.

3. The mobile robot of claim 1, wherein the task execution system is a floor cleaning system comprising a motor for generating an airflow through the mobile robot.

4. The mobile robot of claim 3, wherein: the first error is an airway blockage; the second error is slip; and the third error is a limpet-state of the mobile robot in which the floor cleaning system of mobile robot has affected operation of the drive system of the mobile robot.

5. The mobile robot of claim 1, wherein automatically adjusting operation of the mobile robot to handle the determined third error comprises adjusting an operation of at least one of the drive system and the task execution system of the mobile robot.

6. A system comprising one or more processors for a mobile robot configured for:
monitoring one or more parameters of a first and a second system of the mobile robot, wherein the first system is a drive system that is configured to drive the mobile robot across a surface and the second system is a task execution system that is configured to perform a task that is assigned to the mobile robot;
identifying a first set of parameters indicative of a first error associated with the first system and a second set of parameters indicative of a second error of the second system;
determining that:
   a first error has occurred in response to identifying the first set of parameters that are indicative of the first error,
   a second error has occurred in response to identifying the second set of parameters that are indicative of the second error, wherein the second error is different than the first error and is an error in performance of the task, and
   a third error has occurred in response to contemporaneously determining that the first error has occurred and the second error has occurred; and
in response to determining that the third error has occurred, automatically adjusting operation of the mobile robot to handle the determined third error.

* * * * *